(12) United States Patent
Kuo et al.

(10) Patent No.: US 7,285,147 B2
(45) Date of Patent: Oct. 23, 2007

(54) AIR SUPPLY SYSTEMS AND PRESSURE ADJUSTMENT DEVICES FOR USE THEREWITH

(75) Inventors: Po-Sung Kuo, Sinying (TW); Yung-Dar Chen, Baoshan Hsiang (TW); Jheng-Long Chou, Miao-Lee (TW); Tung-Li Wu, Shih-Chao Village (TW); Ming-Wen Huang, Hemei Town (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 396 days.

(21) Appl. No.: 11/001,770

(22) Filed: Dec. 2, 2004

(65) Prior Publication Data

US 2006/0117722 A1 Jun. 8, 2006

(51) Int. Cl.
*F24F 11/00* (2006.01)
(52) U.S. Cl. .............................. 55/385.2; 55/DIG. 34; 96/421; 454/187; 454/259; 454/191; 73/31.04; 116/268; 116/271; 116/DIG. 25
(58) Field of Classification Search ............... 55/385.2, 55/DIG. 34; 454/187, 238, 239, 259, 191; 96/421; 73/31.04; 116/268, 271, DIG. 25
See application file for complete search history.

(56) References Cited

U.S. PATENT DOCUMENTS 2,746,146 A * 5/1956 Aufderheide ............... 116/275

| | | | |
|---|---|---|---|
| 5,099,751 A * | 3/1992 | Newman et al. | 454/238 |
| 5,350,336 A * | 9/1994 | Chen et al. | 454/187 |
| 6,190,442 B1 * | 2/2001 | Redner | 96/421 |
| 6,960,244 B2 * | 11/2005 | Lehman | 95/273 |

FOREIGN PATENT DOCUMENTS

TW 287297 3/1985

OTHER PUBLICATIONS

Taiwan Search Report issued Jul. 3, 2006.

* cited by examiner

*Primary Examiner*—Duane Smith
*Assistant Examiner*—Minh-Chau T. Pham
(74) *Attorney, Agent, or Firm*—Thomas, Kayden, Horstemeyer & Risley

(57) ABSTRACT

An air supply system for a clean room with a critical machine. An intake duct connects the exterior of the clean room to a make-up air unit, and is configured to transport external air into the make-up air unit. A first air duct connects the make-up air unit to an air conditioning cabinet including a first chemical filter, and is configured to transport the air flowing through the make-up air unit into the air conditioning cabinet. The first chemical filter removes airborne molecular contamination from the air transported into the air conditioning cabinet. A second air duct connects the air conditioning cabinet to the critical machine, and is configured to transport the air flowing through the first chemical filter of the air conditioning cabinet into the critical machine. An exhaust duct connects the critical machine to the exterior of the clean room, discharging waste gas produced in the critical machine.

16 Claims, 6 Drawing Sheets

AIR SUPPLY SYSTEMS AND PRESSURE ADJUSTMENT DEVICES FOR USE THEREWITH

BACKGROUND

The invention relates to air supply systems, and in particular to air supply systems that can be used in clean rooms.

An important semiconductor manufacturing process, such as a lithography (exposure) process, must be performed in a clean room where lithography machines are located. Typically, such a semiconductor manufacturing process is performed under a certain air condition. Namely, airborne molecular contamination (AMC) in the clean room must be precisely controlled, such that the semiconductor manufacturing process can be successfully performed. Airborne molecular contamination can include total organic compound (TOC), $NH_3$, and total sulfur (TS), for example.

Referring to FIG. 1, a conventional clean room 1 includes multiple floors, such as a first floor 11 and a second floor 12. A plurality of machines for manufacturing semiconductors, such as multiple general machines 21 and a critical machine 22, are disposed on one of the floors, such as the second floor 12. As is known, a critical machine may require more highly filtered air than one or more other machines in the clean room. A conventional air supply system is deployed in the clean room 1, providing clean air to the general machines 21 and critical machine 22. The air supply system comprises an intake duct 31, a make-up air unit (MAU) 32, a first air duct 33, an air conditioning cabinet (ACC) 34, a second air duct 35, an exhaust duct 36, and a plurality of fan filter units (FFU) 37. One end of the intake duct 31 is positioned at the exterior of the clean room 1 and the other end is connected to the make-up air unit 32. The make-up air unit 32 and fan filter units 37 are disposed on the second floor 12 of the clean room 1. One end of the first air duct 33 is connected to the make-up air unit 32 and the other end is in the clean room 1. The air conditioning cabinet 34 is disposed on the first floor 11 and is connected to the critical machine 22 by means of the second air duct 35. Specifically, since the critical machine 22 requires extremely clean air, the air conditioning cabinet 34 is provided with a chemical filter (not shown) to further purify the air supplied. Additionally, one end of the exhaust duct 36 is positioned at the exterior of the clean room 1 and the other end is connected to the critical machine 22.

As shown in FIG. 1, air can be drawn into the make-up air unit 32 via the intake duct 31 by a fan (not shown) of the make-up air unit 32. Airborne molecular contamination (contaminants) and particles in the air can be preliminarily removed by the make-up air unit 32. Additionally, the temperature and humidity of the air can be adjusted by the make-up air unit 32. The air flowing through the make-up air unit 32 is transported into the clean room 1 (first floor 11) via first air duct 33. The air then enters the second floor 12 and air conditioning cabinet 34. Accordingly, the air entering the second floor 12 from the first floor 11 can be used by the general machines 21. In another aspect, the air further filtered by the air conditioning cabinet 34 enters the critical machine 22 via the second air duct 35. Waste gas produced in the critical machine 22 can be exhausted via the exhaust duct 36. The fan filter units 37 can produce air circulation in the clean room 1 and filters (not shown) thereof can further remove the particles therein.

Accordingly, during operation of the general machines 21 and critical machine 22, waste gas containing by-products is produced. The waste gas also includes high-concentration airborne molecular contamination. Furthermore, the waste gas typically leaks into the clean room 1 because the air pressure in the general machines 21 and critical machine 22 typically exceeds that of the environment (or in the clean room 1), increasing airborne molecular contamination therein. Under this condition, the lifespan of the chemical filter in the air conditioning cabinet 34 is greatly reduced and the chemical filter must be replaced frequently. The chemical filter, however, is very expensive. Thus, frequent replacement of the chemical filter results in increased manufacturing costs.

SUMMARY

There is a need to provide an improved air supply system providing clean air to a clean room and effectively increasing the lifespan of a chemical filter in an air conditioning cabinet therein.

An exemplary embodiment provides an air supply system for a clean room with a critical machine. The air supply system comprises a make-up air unit, an intake duct, an air conditioning cabinet, a first air duct, a second air duct, and an exhaust duct. The intake duct connects the exterior of the clean room to the make-up air unit, and is configured to transport external air into the make-up air unit. The air conditioning cabinet comprises a first chemical filter. The first air duct connects the make-up air unit to the air conditioning cabinet, and is configured to transport the air flowing through the make-up air unit into the air conditioning cabinet. The first chemical filter removes airborne molecular contamination from the air transported into the air conditioning cabinet. The second air duct connects the air conditioning cabinet to the critical machine, and is configured to transport the air flowing through the first chemical filter of the air conditioning cabinet into the critical machine. The exhaust duct connects the critical machine to the exterior of the clean room to discharge waste gas thereto.

Another embodiment of an air supply system further comprises a boost fan connected to the first air duct. The temperature and humidity of the air transported into the air conditioning cabinet are adjusted by the boost fan.

Another embodiment of an air supply system further comprises a pressure adjustment device located between the boost fan and the air conditioning cabinet to adjust the pressure of the air transported into the air conditioning cabinet.

An exemplary embodiment of a pressure adjustment device further comprises a rotating plate and the first air duct further comprises a duct wall and an opening formed therein. The rotating plate is disposed in the opening and pivots to the duct wall.

Another embodiment of a pressure adjustment device comprises a first position sensor array and a second position sensor array. The first position sensor array is disposed in the first air duct and the second position sensor array is located at the exterior of the first air duct. The first and second position sensor arrays detect the rotational position of the rotating plate.

An exemplary embodiment of an air supply system comprises a pressure adjustment device disposed on the air conditioning cabinet to adjust the pressure of the air transported into the air conditioning cabinet.

Another embodiment of a pressure adjustment device further comprises a rotating plate and the air conditioning cabinet further comprises a sidewall and an opening formed therein. The rotating plate is disposed on the opening and pivots to the sidewall.

Another embodiment of a pressure adjustment device further comprises a first position sensor array and a second position sensor array. The first position sensor array is disposed in the air conditioning cabinet. The second position sensor array is located at the exterior of the air conditioning cabinet. The first and second position sensor arrays detect the rotational position of the rotating plate.

Another embodiment of a first and second position is sensor arrays respectively comprise two opposing infrared sensors.

Another embodiment of a pressure adjustment device further comprises a balance weight connected to the rotating plate.

Another embodiment of an air supply system further comprises a fan filter unit disposed in the clean room to purify and circulate air therein.

Another embodiment of a make-up air unit further comprises a pre-filter, a first heater, a fan, a first condenser, an air washer, a second condenser, a second heater, a second chemical filter, and a HEPA filter, sequentially disposed therein.

Another embodiment of an air supply system further comprises an air bypass duct connected to the first air duct and between the make-up air unit and the boost fan.

BRIEF DESCRIPTION OF THE DRAWINGS

The invention can be more fully understood by reading the subsequent detailed description and examples with references made to the accompanying drawings, wherein.

DETAILED DESCRIPTION

First Embodiment

Figure 1:
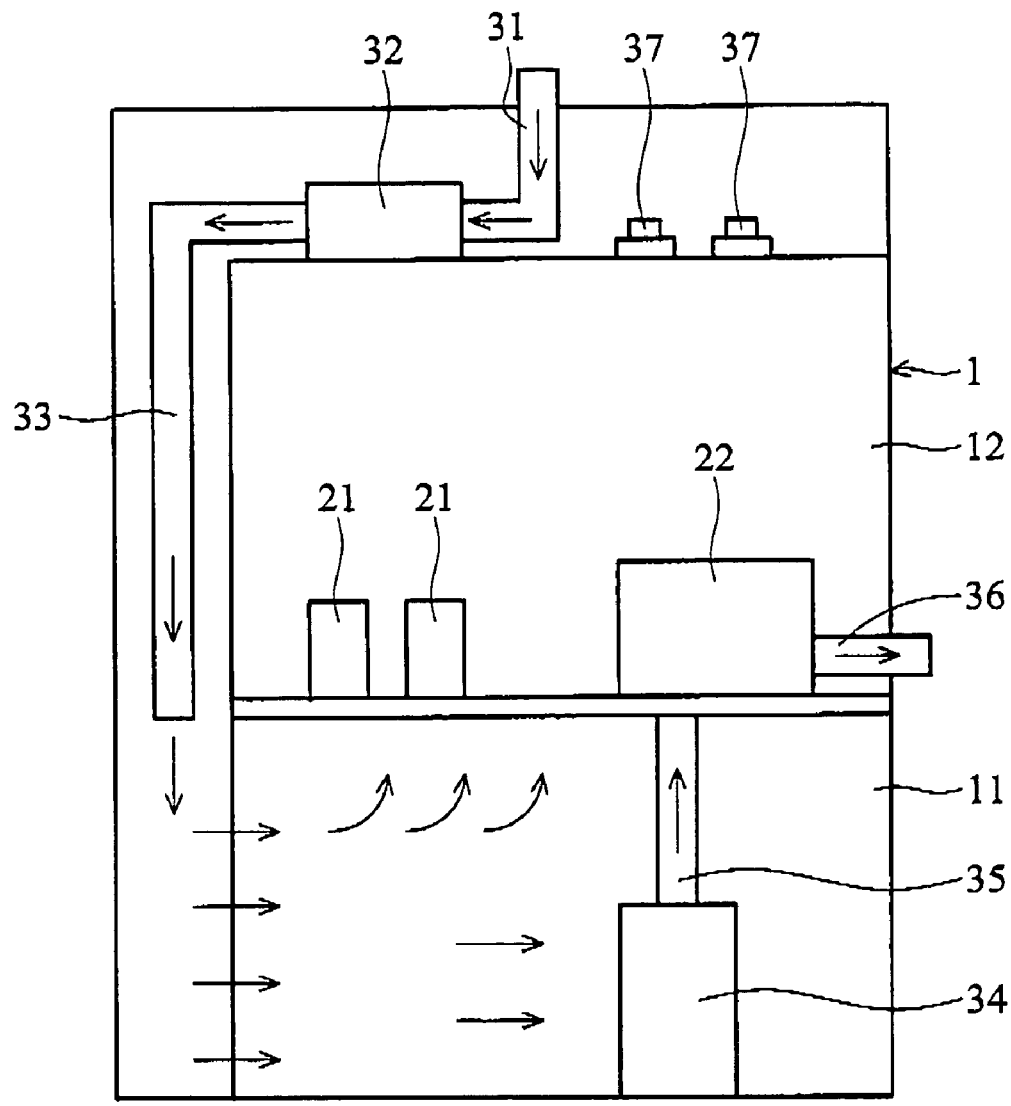
FIG. 1 is a schematic plan view of a conventional air supply system for a clean room.
Figure 2:
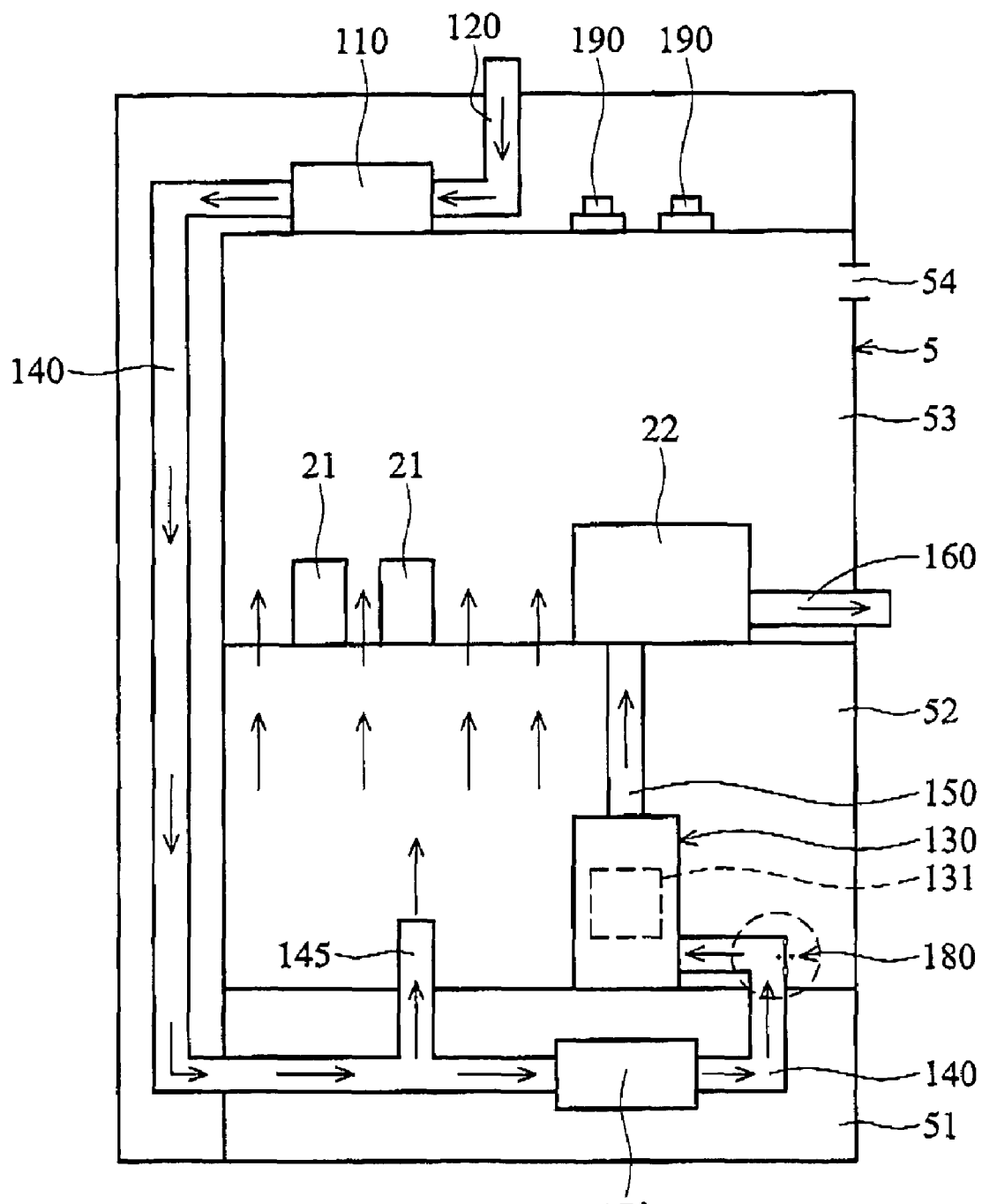
FIG. 2 is a schematic plan view of the air supply system for a clean room according to a first embodiment of the invention.

Referring to FIG. 2, the air supply system of the first embodiment is employed in a clean room 5 comprising a first floor 51, a second floor 52, and a third floor 53. A plurality of general machines 21 and a critical machine 22 can be disposed on the third floor 53. The critical machine 22, for example, may be a litho scanner employed in a lithography (exposure) process.

The air supply system of this embodiment comprises a make-up air unit (MAU) 110, an intake duct 120, an air conditioning cabinet (ACC) 130, a first air duct 140, an air bypass duct 145, a second air duct 150, an exhaust duct 160, a boost fan 170, a pressure adjustment device 180, and a plurality of fan filter units (FFU) 190.

As shown in FIG. 2, the make-up air unit 110 is disposed on the third floor 53 of the clean room 5. The intake duct 120 connects the exterior of the clean room 5 to the make-up air unit 110.

Figure 3:
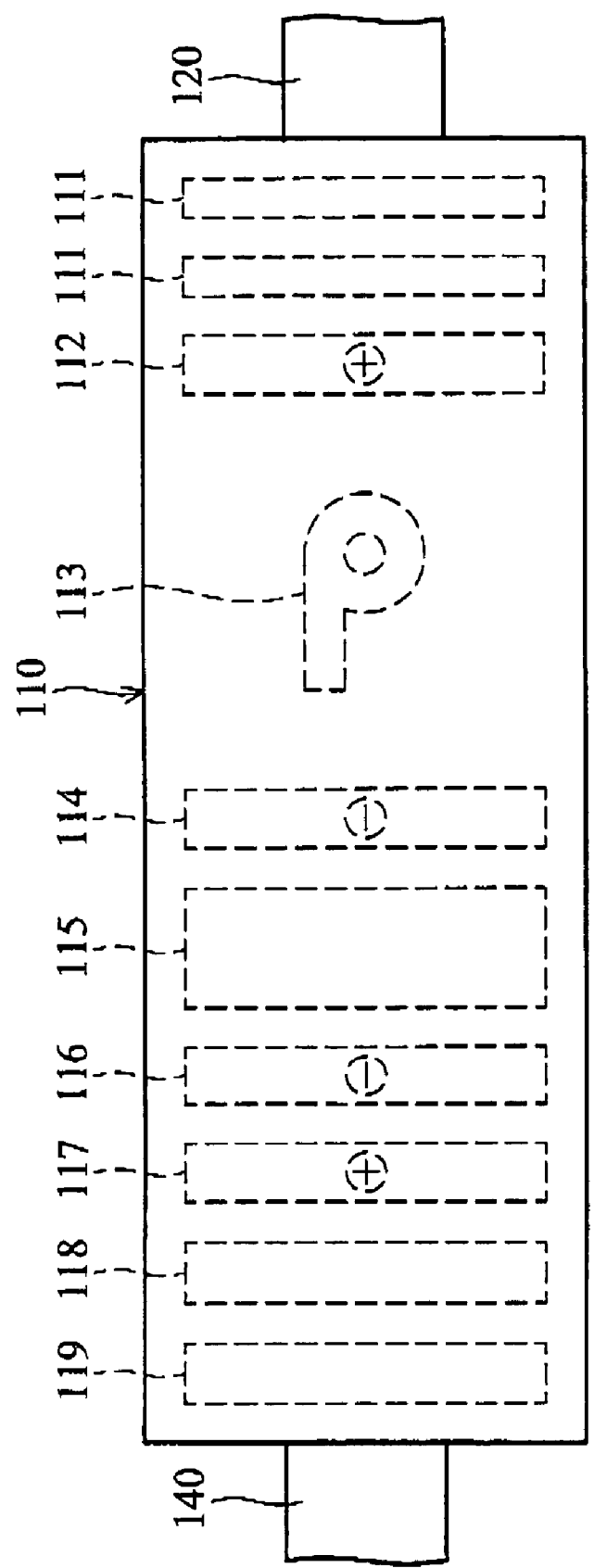
FIG. 3 is a schematic view of the inner structure of the make-up air unit of an embodiment of the invention.

Referring to FIG. 3, two pre-filters 111, a first heater 112, a fan 113, a first condenser 114, an air washer 115, a second condenser 116, a second heater 117, a second chemical filter 118, and a HEPA filter 119 are sequentially disposed in the make-up air unit 110.

The air conditioning cabinet 130 is disposed in the second floor 52 of the clean room 5 and comprises a first chemical filter 131.

The first air duct 140 connects the make-up air unit 110 to the air conditioning cabinet 130. The boost fan 170 is connected to the first air duct 140 and the air bypass duct 145 is connected to the first air duct 140. Specifically, the air bypass duct 145 is connected between the make-up air unit 110 and the boost fan 170 and extends from the first air duct 140 disposed on the first floor 51 to the second floor 52.

The second air duct 150 connects the air conditioning cabinet 130 to the critical machine 22. The exhaust duct 160 connects the critical machine 22 to the exterior of the clean room 5.

Figure 4:
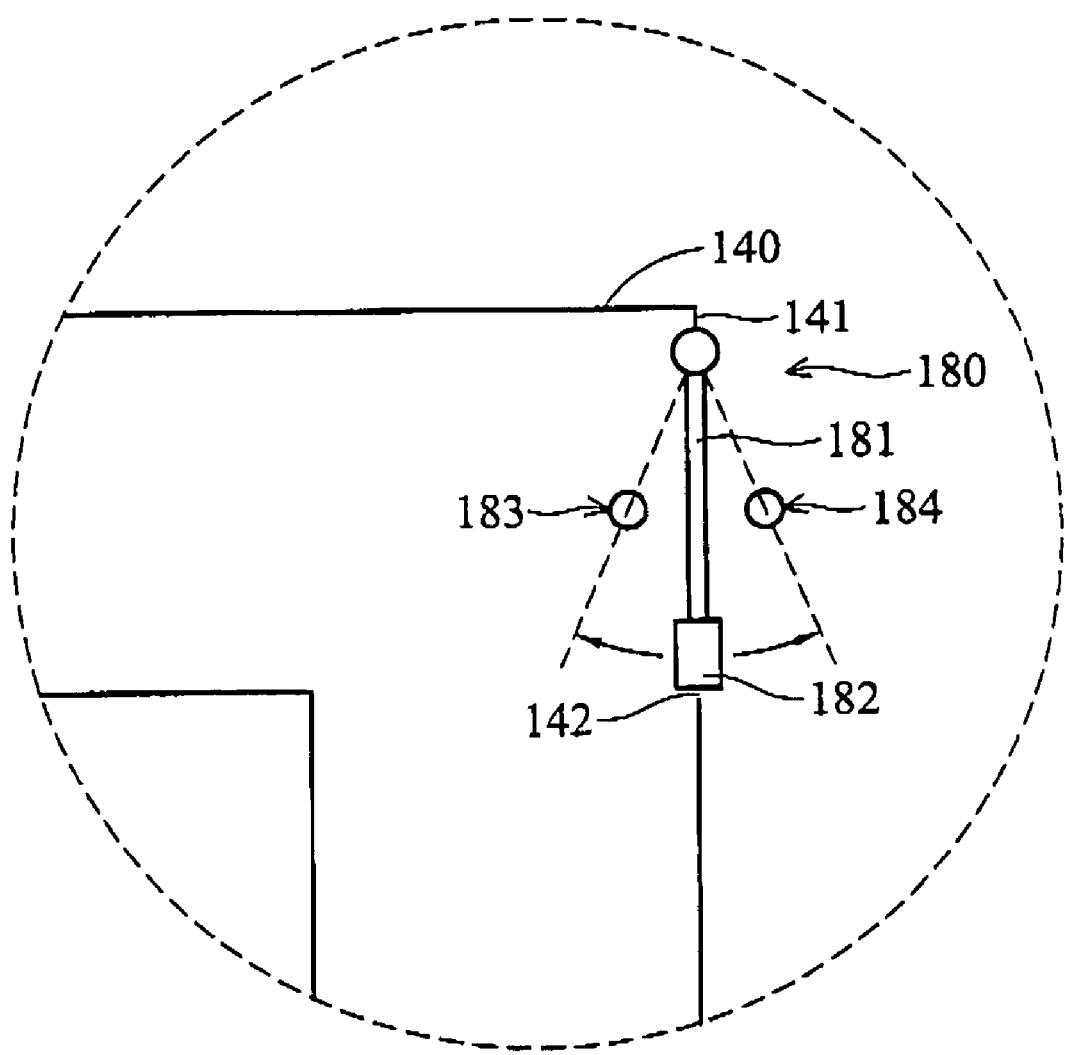
FIG. 4 is a schematic enlarged view of the pressure adjustment device according to FIG. 2.

The pressure adjustment device 180 is located between the boost fan 170 and the air conditioning cabinet 130. As shown in FIG. 4, the pressure adjustment device 180 comprises a rotating plate 181, a balance weight 182, a first position sensor array 183, and a second position sensor array 184. The first air duct 140 comprises a duct wall 141 and an opening 142 formed therein. The rotating plate 181 is disposed in the opening 142 and pivots to the duct wall 141. The balance weight 182 is connected to the rotating plate 181. The first position sensor array 183 is disposed in the first air duct 140 while the second position sensor array 184 is disposed in the exterior of the first air duct 140. The first position sensor array 183 and second position sensor array 184, in this embodiment, respectively comprise two opposing infrared sensors.

Accordingly, the balance weight 182 can be connected to the rotating plate 181 according to an air pressure requirement in the first air duct 140. The balance weight 182 can rotate with the rotating plate 181 between the interior and exterior of the first air duct 140. The first position sensor array 183 and second position sensor array 184 detect the rotational position of the rotating plate 181 and are connected to an alarm device (not shown). Specifically, the disposed positions of the first position sensor array 183 and second position sensor array 184 are determined according to an air pressure requirement in the first air duct 140. Operation of the pressure adjustment device 180 is described later in the disclosure.

As shown in FIG. 2 and FIG. 3, air outside the clean room 5 is drawn into the make-up air unit 110 via the intake duct 120 by the fan 113 thereof. Particles in the air can be removed by the pre-filters 111 of the make-up air unit 110. After heating by the first heater 112 and cooling and dehumidification by the first condenser 114, the air enters the air washer 115. At this point, airborne molecular contamination, such as $NH_3$, $SO_4^{2-}$, $NO_3^-$, $PO_3^-$, $F^-$, $Cl^-$, is partially removed from the air by the air washer 115. Specifically, since the temperature and humidity, for example 16° C./50% RH, of the air flowing through the air washer 115 may not meet clean room 5 (or general machines 21) requirements, the air is cooled again by the second condenser 116 and further heated by the second heater 117 to comply with temperature and humidity requirements. The air then enters the second chemical filter 118 and the airborne molecular contamination therein is removed. After flowing through the HEPA filter 119, the air is transported via the first air duct 140. At this point, the airborne molecular contamination in the air is greatly reduced.

As shown in FIG. 2, after the air flows through the make-up air unit 110, a part of the air enters the second floor 52 of the clean room 5 via the air bypass duct 145 and the other part is drawn by the boost fan 170. The air transported into the second floor 52 further enters the third floor 53 to be utilized by the general machines 21. Specifically, the air circulates throughout the second floor 52 and third floor 53 by operation of the fan filter units 190. Additionally, the particles in the clean room 5 (second floor 52 and third floor 53) can be further removed by filters (not shown) disposed in the fan filter units 190. Moreover, the air in the clean room 5 can be exhausted via an outlet 54.

In some embodiments, in addition to transporting the air, the boost fan 170 can adjust the air temperature and humidity to satisfy requirements (such as 22° C./45% RH) for air transported into the air conditioning cabinet 130.

As shown in FIG. 2, the air is transported into the air conditioning cabinet 130 by the boost fan 170. Specifically, the air transported into the air conditioning cabinet 130 via the first air duct 140 is limited to having a predetermined pressure. The rotating plate 181 and balance weight 182 rotate toward the exterior of the first air duct 140 to release the air when the pressure thereof exceeds the predetermined pressure. Conversely, the rotating plate 181 and balance weight 182 rotate toward the interior of the first air duct 140 to receive additional air (the air from the clean room 5) when the pressure of the air therein is less than the predetermined pressure. Specifically, as shown in FIG. 4, the rotational angle of the rotating plate 181 and balance weight 182 is pertinent to whether or not the air is transported normally. Accordingly, when the rotating plate 181 and balance weight 182 rotate inward or outward in excess of a predetermined angle, an alarm device of the air supply system issues an alert, informing an operator. Detailed operation of the alarm device is provided in the following. The opposing infrared sensors of the first position sensor array 183 are disposed in the first air duct 140 and those of the second position sensor array 184 are disposed in the exterior thereof. When rotating out of range, the rotating plate 181 and balance weight 182 interdict the opposing infrared sensors of the first position sensor array 183 or second position sensor array 184. At this point, the alarm device connected to the first position sensor array 183 and second position sensor array 184 issues an alert.

Moreover, the first air duct 140 between the air conditioning cabinet 130 and the boost fan 170 is not limited to having only one pressure adjustment device 180. Namely, more pressure adjustment devices 180 may be disposed on the first air duct 140 between the air conditioning cabinet 130 and the boost fan 170 as required.

As shown in FIG. 2, the air enters the air conditioning cabinet 130. At this point, only a small amount of the airborne molecular contamination can be removed from the air by the first chemical filter 131 of the air conditioning cabinet 130. The air then enters the critical machine 22 via the second air duct 150 to be utilized thereby. Waste gas containing high-concentration airborne molecular contamination and produced in the critical machine 22 can be directly exhausted via the exhaust duct 160.

Second Embodiment

In this embodiment, elements corresponding to those in the first embodiment share the same reference numerals, and explanation thereof is omitted to simplify the description.

Figure 5:
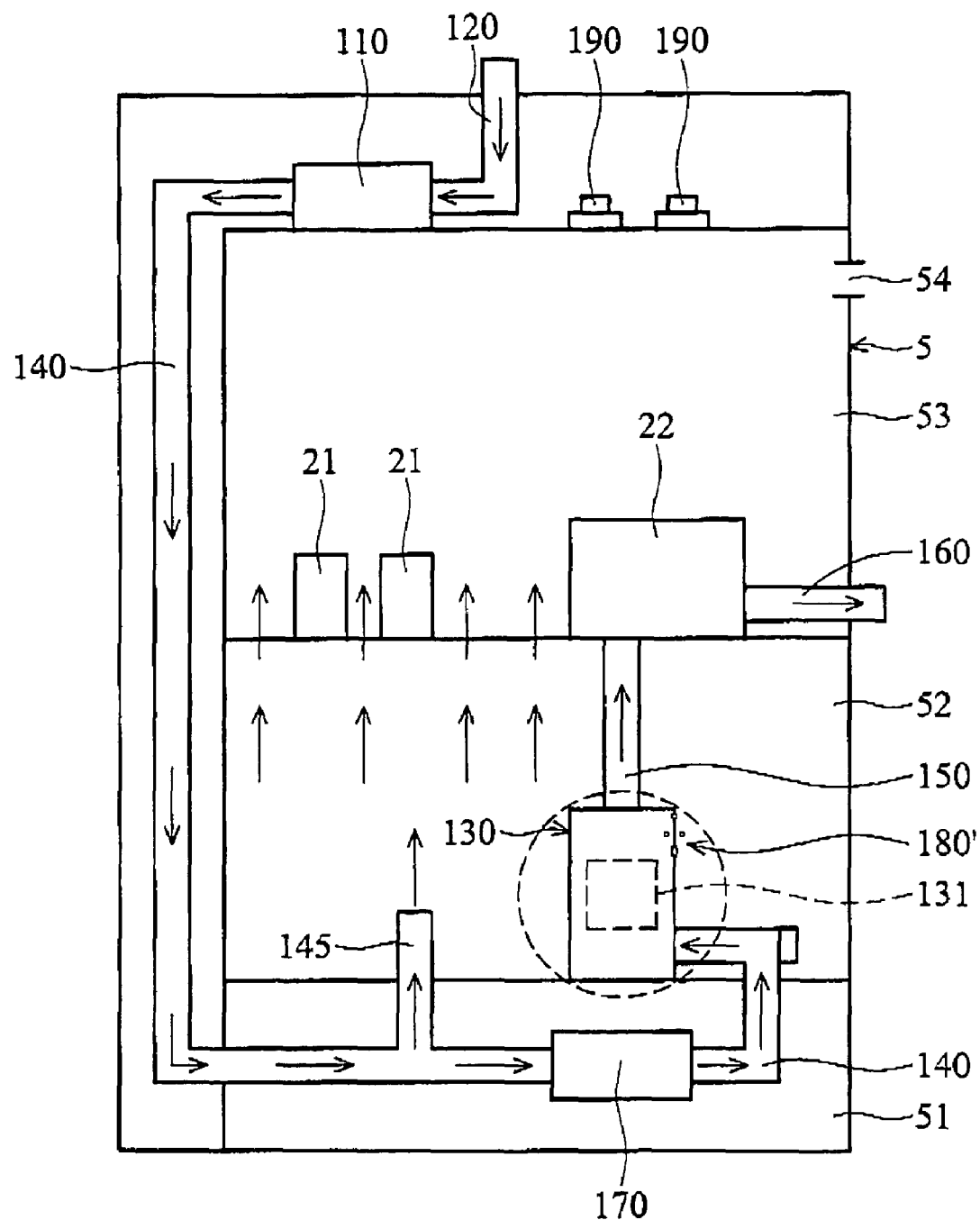
FIG. 5 is a schematic plan view of the air supply system for a clean room according to a second embodiment of the invention.

Referring to FIG. 5, the difference between the first and the second embodiments is that the pressure adjustment device 180' of the second embodiment is disposed on the air conditioning cabinet 130.

Figure 6:
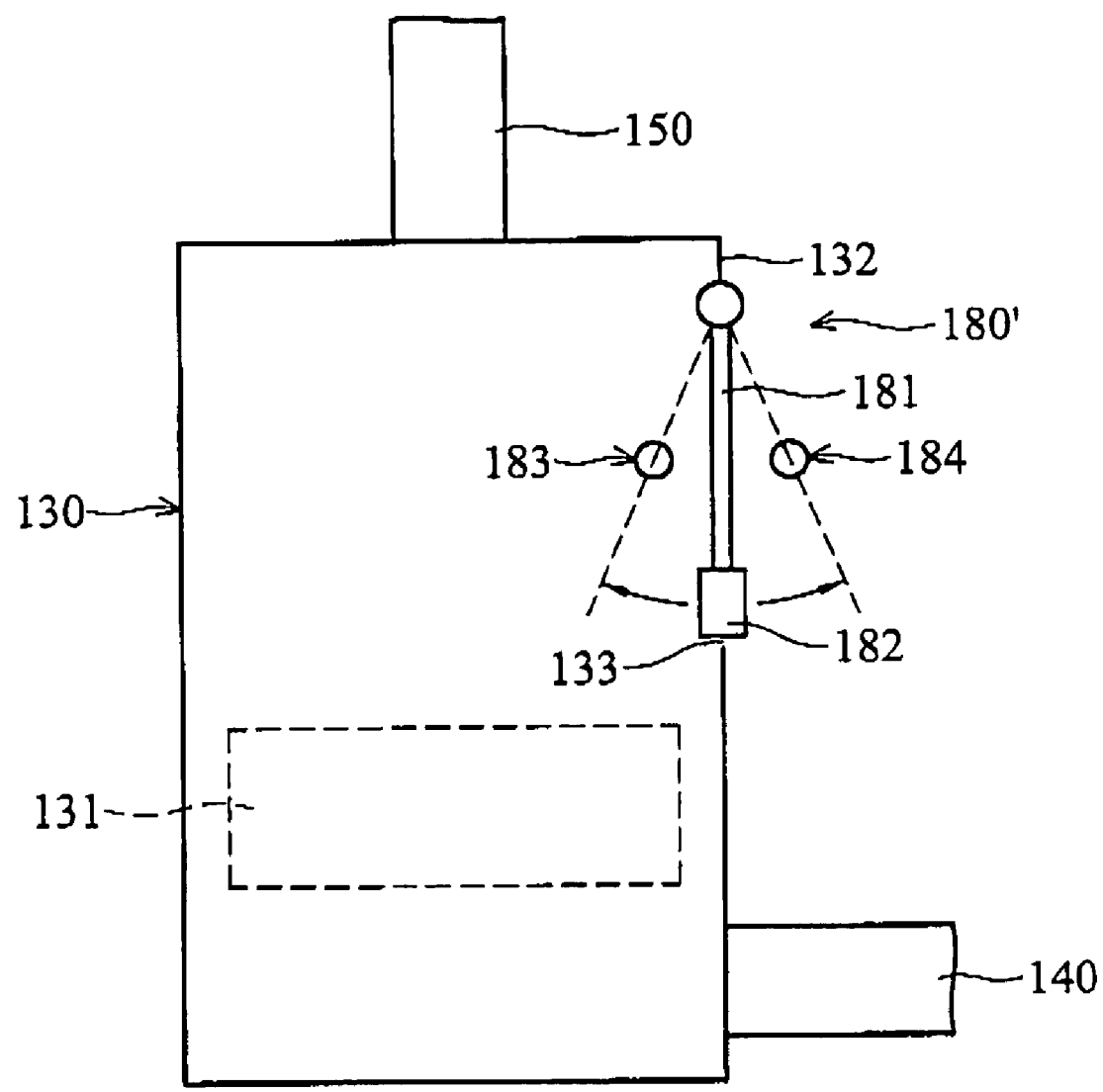
FIG. 6 is a schematic enlarged view of the pressure adjustment device according to FIG. 5.

Referring to FIG. 6, the pressure adjustment device 180' comprises a rotating plate 181, a balance weight 182, a first position sensor array 183, and a second position sensor array 184. The air conditioning cabinet 130 comprises a sidewall 132 and an opening 133 formed thereon. The rotating plate 181 is disposed in the opening 133 and pivots to the sidewall 132. The balance weight 182 is connected to the rotating plate 181. The first position sensor array 183 is disposed in the air conditioning cabinet 130 while the second position sensor array 184 is located at the exterior of the air conditioning cabinet 130. Similarly, the first position sensor array 183 and second position sensor array 184, in this embodiment, respectively comprise two opposing infrared sensors.

Similarly, the air conditioning cabinet 130 is not limited to having only one pressure adjustment device is 180'. Namely, more pressure adjustment devices 180' may be disposed on the air conditioning cabinet 130 as required.

Moreover, operation of the pressure adjustment device 180' and air supply system of this embodiment is the same as that of the pressure adjustment device 180 and air supply system of the first embodiment.

In conclusion, the air supply system can directly provide clean air to the air conditioning cabinet, prolonging the lifespan of the first chemical filter thereof. Although the general machines and critical machine may leak, the waste gas containing high-concentration airborne molecular contamination does not adversely affect operation of the critical machine and reduce the lifespan of the first chemical filter. Moreover, the pressure adjustment device enables stable and convenient operation of the air supply system.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An air supply system for a clean room with a critical machine, comprising:
   a make-up air unit;
   an intake duct connecting the exterior of the clean room to the make-up air unit, and being configured to transport external air into the make-up air unit;
   an air conditioning cabinet, with a first chemical filter;
   a first air duct connecting the make-up air unit to the air conditioning cabinet, and being configured to transport the air flowing through the make-up air unit into the air conditioning cabinet, wherein the first chemical filter removes airborne molecular contamination from the air transported into the air conditioning cabinet;
   a boost fan connected to the first air duct, wherein temperature and humidity of the air transported into the air conditioning cabinet are adjusted by the boost fan;
   a second air duct connecting the air conditioning cabinet to the critical machine, and being configured to transport the air flowing through the first chemical filter of the air conditioning cabinet into the critical machine; and
   an exhaust duct connecting the critical machine to the exterior of the clean room, and being configured to discharge waste gas produced in the critical machine to the exterior of the clean room.

2. The air supply system as claimed in claim 1, further comprising a pressure adjustment device located between the boost fan and the air conditioning cabinet, said pressure adjustment device being configured to adjust the pressure of the air transported into the air conditioning cabinet.

3. The air supply system as claimed in claim 2, wherein the pressure adjustment device further comprises a rotating plate, the first air duct further comprises a duct wall and an opening formed therein, and the rotating plate is disposed in the opening and is operative to pivot to the duct wall.

4. The air supply system as claimed in claim 3, wherein the pressure adjustment device further comprises a balance weight connected to the rotating plate.

5. The air supply system as claimed in claim 3, wherein the pressure adjustment device further comprises a first position sensor array and a second position sensor array, the first position sensor array is disposed in the first air duct, the second position sensor array is disposed at the exterior of the first air duct, and the first and second position sensor arrays detect the rotational position of the rotating plate.

6. The air supply system as claimed in claim 5, wherein the first and second position sensor arrays respectively comprise two opposing infrared sensors.

7. The air supply system as claimed in claim 1, further comprising a pressure adjustment device disposed on the air conditioning cabinet to adjust the pressure of the air transported into the air conditioning cabinet.

8. The air supply system as claimed in claim 7, wherein the pressure adjustment device further comprises a rotating plate, the air conditioning cabinet further comprises a sidewall and an opening formed therein, and the rotating plate is disposed on the opening and pivots to the sidewall.

9. The air supply system as claimed in claim 8, wherein the pressure adjustment device further comprises a balance weight connected to the rotating plate.

10. The air supply system as claimed in claim 8, wherein the pressure adjustment device further comprises a first position sensor array and a second position sensor array, the first position sensor array is disposed in the air conditioning cabinet, the second position sensor array is disposed in the exterior of the air conditioning cabinet, and the first and second position sensor arrays detect the rotational position of the rotating plate.

11. The air supply system as claimed in claim 10, wherein the first and second position sensor arrays respectively comprise two opposing infrared sensors.

12. The air supply system as claimed in claim 1, further comprising a fan filter unit disposed in the clean room to purify and circulate the air therein.

13. The air supply system as claimed in claim 1, wherein the make-up air unit further comprises a pre-filter, a first heater, a fan, a first condenser, an air washer, a second condenser, a second heater, a second chemical filter, and a HEPA filter, sequentially disposed therein.

14. The air supply system as claimed in claim 1, further comprising an air bypass duct connected to the first air duct and connected between the make-up air unit and the boost fan.

15. A pressure adjustment device for adjusting the pressure of a fluid in a circuit system comprising a sidewall and an opening formed therein, said pressure adjustment device comprising:

a rotating plate disposed in the opening and pivoting to the sidewall;

a balance weight connected to the rotating plate, wherein the rotating plate and balance weight rotate toward the exterior of the circuit system to release the fluid when the pressure thereof exceeds a predetermined pressure, and the rotating plate and balance weight rotate toward the interior of the circuit system to receive additional fluid when the pressure of the fluid therein is less than the predetermined pressure;

a first position sensor array disposed in the circuit system; and a second position sensor array disposed at the exterior of the circuit system, wherein the first and second position sensor arrays detect the rotational position of the rotating plate.

16. The pressure adjustment device as claimed in claim 15, wherein the first and second position sensor arrays respectively comprise two opposing infrared sensors.

* * * * *